United States Patent
Isashi et al.

(10) Patent No.: US 6,750,916 B1
(45) Date of Patent: Jun. 15, 2004

(54) PROTECTIVE LID HAVING A FLASH UNIT INCORPORATED THEREIN FOR A DIGITAL CAMERA

(75) Inventors: Yasuo Isashi, Sagamihara (JP); Toshiyuki Toyofuku, Hachioji (JP); Kaoru Kaneko, Kunitachi (JP)

(73) Assignee: Olympus Corporation (JP)

( * ) Notice: Subject to any disclaimer, the term of this patent is extended or adjusted under 35 U.S.C. 154(b) by 0 days.

(21) Appl. No.: 09/086,015

(22) Filed: May 28, 1998

(30) Foreign Application Priority Data

| May 30, 1997 | (JP) | ............................................. 9-142522 |
| May 30, 1997 | (JP) | ............................................. 9-142523 |
| May 30, 1997 | (JP) | ............................................. 9-142525 |

(51) Int. Cl.$^7$ ............................................. H04N 5/225
(52) U.S. Cl. ...................................... 348/376; 348/374
(58) Field of Search ................................. 348/373, 375, 348/376, 371; 396/178, 348, 448, 200, 176, 177; D16/209, 239, 212, 211

(56) References Cited

U.S. PATENT DOCUMENTS

| 4,106,037 A | * | 8/1978 | Nakamura et al. ........... 396/178 |
| 4,334,262 A | * | 6/1982 | Latos ........................... 362/11 |
| 4,853,723 A | * | 8/1989 | Akabane et al. ............. 396/178 |
| 4,941,070 A | * | 7/1990 | Ogawa et al. ............... 396/175 |
| 5,371,563 A | * | 12/1994 | Dassero et al. .............. 396/200 |
| 5,541,687 A | * | 7/1996 | Pearson ...................... 396/200 |
| 5,543,876 A | * | 8/1996 | Suzuki et al. ................ 396/176 |
| 5,619,297 A | * | 4/1997 | Noguchi ..................... 396/201 |
| 5,752,084 A | * | 5/1998 | Motomura et al. .......... 396/177 |
| 5,892,992 A | * | 4/1999 | Green ......................... 396/191 |
| 5,987,263 A | * | 11/1999 | Toyoda et al. .............. 396/178 |

FOREIGN PATENT DOCUMENTS

| JP | 61140338 | 8/1986 |
| JP | 7-306453 | 11/1995 |
| JP | 8-129207 | 5/1996 |
| JP | 08069039 | * 12/1996 |

* cited by examiner

*Primary Examiner*—Wendy R. Garber
*Assistant Examiner*—Jason Whipkey
(74) *Attorney, Agent, or Firm*—Ostrolenk, Faber, Gerb & Soffen, LLP

(57) ABSTRACT

This electronic imaging apparatus comprises in front of a body an open/close lid for protecting a picture-taking lens, the open/close lid where a strobe flashing unit is incorporated, and a housing, which is a structure of the body, and its exterior (members from a housing to its exterior) that are formed with conductive material, the electronic imaging apparatus wherein a trigger transformer for strobe flashing is also incorporated with the strobe flashing unit in the open/close lid for protecting the picture-taking lens, a part of the housing near to the strobe flashing unit is formed with a non-conductive clear member, and this clear member is constructed with including a flash transmitting surface portion making flash from the strobe flashing unit pass and a part that is a part except this flash transmitting surface portion and faces to a part of the back of a strobe reflector.

2 Claims, 9 Drawing Sheets

PROTECTIVE LID HAVING A FLASH UNIT INCORPORATED THEREIN FOR A DIGITAL CAMERA

BACKGROUND OF THE INVENTION

1. Field of the Invention

The present invention relates to an electronic imaging apparatus, and in particular, to an electronic imaging apparatus that electronically records images taken with an image pickup device, comprising a strobe device in its body and an open/close lid for protecting an image pickup lens, wherein a strobe flashing unit of this strobe device is incorporated in the open/close lid.

2. Description of the Related Art

Up to now, in cameras for taking pictures using silver halide film, electronic imaging apparatuses such as digital still cameras that electronically record image signals obtained by image pickup devices, and the like, a slidably moveable open/close lid is provided to protect a picture-taking lens that is in the front of the camera and other respective constitutive members located in an exterior part in the front of the camera when the camera is not being used.

In addition, various cameras with which picture-taking is performed using conventional silver halide film and the like inclusion of a strobe device composed of a strobe flashing unit inside the lens barrier and the like has been proposed. Japanese Utility Unexamined Publication No. 61-140338 is an example of such a strobe device in use.

According to a conventional camera that includes a strobe flashing unit in a lens barrier for protecting the front of a picture-taking lens, it is possible to keep a distance between the strobe flashing unit and the picture-taking lens by moving the lens barrier to the open direction at the time of picture-taking, and thus suppressing the red-eye phenomenon.

In addition, since a lens barrier occupies a comparatively large area on a camera body, the placing of a strobe flashing unit on this lens barrier is advantageous in that it is possible to effectively utilize the area occupied by the lens barrier, and thus it becomes possible to further reduce the size of the entire camera.

However, if the open/close lid for protecting a picture-taking lens (a lens barrier) as used in a conventional silver halide film is applied to an electronic imaging apparatus such as a digital still camera, it is not possible to take a satisfactory image because electromagnetic wave noise and the like that occur at the time of flashing of the strobe adversely affect an image pickup device, an image pickup circuit, and the like. Therefore, the use of the above-described construction in the conventional camera for an electronic imaging apparatus is problematic.

In a common strobe flashing unit, electric charges charged in a strobe capacitor by the control of a strobe circuit are supplied by a xenon tube, high voltage generated in a trigger transformer is applied to a reflector, and the xenon tube is flashed thereby. In this case, there is also plenty of electromagnetic wave noise because of the high voltage generated in particular between the trigger transformer and the xenon tube.

In the conventional construction of a lens barrier incorporating a strobe flashing unit, it is well known to place only a xenon tube and a reflector inside a lens barrier and to place members such as a trigger transformer in the camera body.

Therefore, the trigger transformer and the reflector of the xenon tube are connected with a long harness and the like including the margin, that is, a moving distance of the lens barrier. The large electromagnetic wave noise and the like occur from this long harness, and hence the harness becomes a source of the electromagnetic wave noise in the camera body. These electromagnetic wave noise and the like were not serious problems in conventional cameras not using each image pickup device and the like, that is, cameras using silver halide film.

However, in an electronic imaging apparatus, the above-described electromagnetic wave noise and the like adversely affect the image pickup device which converts an optical subject image, i.e. an image-formed with a picture-taking lens, into an electric signal. The electromagnetic noise also adversely affects the electric circuits of the image pickup system which handle weak signals, for example the image processing circuit, thus causing degradation of image quality.

Furthermore, in an electronic imaging apparatus, electrical countermeasures against the above-described electromagnetic wave noise and the like become necessary. The addition of components to effect the countermeasures results in further problems such as increasing the size of other components like the board and increasing the manufacturing cost.

The electronic imaging apparatus includes more electric part than a camera using silver halide film. Thus, addition of components to effect countermeasures against the electromagnetic noise inevitably increases the size of the apparatus.

On the one hand, the portability and operability of the electronic imaging apparatuses are degraded when the strobe flashing unit is incorporated in the open/close lid because such an arrangement produces an appearance of only the strobe reflector projecting from the open/close lid to the exterior since the strobe reflector is particularly thick.

On the other hand, generally speaking, the open/close lid in a conventional camera is slidably supported on the camera body using guide rails and the like, and is not restricted so firmly.

Therefore, for example, upon application of a strong input, there is a possibility that the open/close lid will be disjoined and will drop from its supporting guide rails.

In particular, if an open/close lid which has a strobe flashing unit incorporated therein drops, there is a possibility that the strobe flashing unit and its charging block will be exposed to the outside such that connecting lines such as lead wires that supply electricity to the strobe flashing unit are connected, or some of the connecting lines become disconnected.

In such a case, an ordinary user may misunderstand that the dropped open/close lid can be easily restored, and may restore the open/close lid to its position while failing to restore the disconnected lines. It is natural that the camera assembled in the incomplete state cannot perform a complete picture-taking operation.

By the way, although, conventional cameras having a strobe device in the camera body are widespread, it is usual to produce each housing, by means of injection molding with nonconductive material.

Therefore, if each housing is formed with the nonconductive material in case of incorporating the strobe device in a camera body of the above-described conventional camera, it is unnecessary to consider in particular the space between the strobe device, which is located in the housing, and the internal wall surface of the housing member.

Then, heretofore, miniaturization of a camera itself has been performed by adjacently placing the strobe reflector, constructing the strobe device provided inside the housing member like. For example, cameras and the like that incorporate each strobe device are disclosed in Japanese Unexamined Patent Publications No. 7-306453 and No. 8-129207.

Nevertheless, since plenty of electronic circuits performing high-speed processing, as described above, are located inside each electronic imaging apparatus, the electromagnetic wave noise occurring from the electronic circuits in the body is large in comparison to conventional cameras using silver halide film.

Since this electromagnetic wave noise and the like cause degradation of the quality of an image shown by a picture signal in the electronic imaging apparatus which electrically records the picture signal, it is necessary to remove the electromagnetic wave noise.

Then, in the conventional electronic imaging apparatuses, various types of means for preventing the above-described electromagnetic wave noise and the like are put into practical use by forming each housing and its exterior with conductive material through, for example, plating, coating, using metal-fiber-containing resin, and the like.

Furthermore, in the design purpose on the apparatus body, using plating, coating, metal-fiber-containing resin, and the like for the housing member is common.

On the one hand, in the above-described cameras and electronic imaging apparatuses having an open/close lid formed with conductive material have been used so as to prevent the adverse effects of the electromagnetic wave noise even if the strobe flashing unit and the like are contained inside the open/close lid.

Nevertheless, if the miniaturization of an electronic imaging apparatus whose housing and exterior are formed with the conductive material as described above is performed by adjacently locating the strobe device located inside the housing and the housing members, there is a possibility that discharge (spark) may occur between the strobe reflector of the strobe device, and the conductive housing members.

In this case, if the discharge arises and its current leaks into the body, there is a possibility that a control means such as the CPU controlling the entire apparatus may be damaged. Therefore, it is an important task to securely prevent occurrence of the above-described discharge.

Then, it is possible to prevent the discharge by securing the sufficient creeping distance between the strobe flashing unit composed of the strobe reflector, xenon tube, and the like and the housing members adjacent to the strobe flashing unit.

Nevertheless, in this case, there is a problem of increasing the size of the apparatus itself because a dead space arises in the housing.

The same problem occurs when the open/close lid comprising the strobe device is formed with the conductive material.

SUMMARY OF THE INVENTION

A first object of the present invention is to provide an electronic imaging apparatus having an open/close lid for protecting a picture-taking lens that is equipped with a strobe flashing unit, adverse effects of electromagnetic wave noise caused by the strobe flashing unit are suppressed.

In addition, a second object of the present invention is to provide an electronic imaging apparatus that is miniaturized and has an excellent portability and satisfactory operability.

Furthermore, a third object of the present invention is to provide an electronic imaging apparatus that can securely prevent a picture-taking failure and the like, which are cause by assembly in an incomplete state, with a texture that prevents an ordinary user from reassembling the apparatus after its accidental disassembly. For example, when the open/close lid for protecting a picture-taking lens drops off from the body.

Moreover, a fourth object of the present invention is to provide an electronic imaging apparatus that can prevent a user from touching these members directly with his/her hand by making electric members such as a charging unit exposed, for example, when the open/close lid drops off from the body.

In addition, a fifth object of the present invention is to provide an electronic imaging apparatus which can prevent adverse effects such as discharge and electromagnetic wave noise occurring from the strobe device and contribute to miniaturization of the apparatus that comprises a strobe device in its body and a housing, which is a structure of the body, having an exterior (members from a housing to its exterior) formed with conductive material.

Briefly, an electronic imaging apparatus according to a first invention comprises in front of a body an open/close lid for protecting a picture-taking lens where a strobe flashing unit is incorporated, the electronic imaging apparatus including a trigger transformer for strobe flashing also incorporated with the strobe flashing unit in the open/close lid for protecting a picture-taking lens.

Therefore, since the strobe flashing unit and trigger transformer for strobe flashing are contained inside the open/close lid for protecting a picture-taking lens, it is possible to realize the miniaturization of the apparatus itself.

In addition, an electronic imaging apparatus according to a second invention comprises in front of a body an open/close lid for protecting a picture-taking lens where a strobe flashing unit is incorporated, the electronic imaging apparatus characterized in that it comprises a cutting means for cutting lead wires electrically connecting the apparatus body and the strobe flashing unit in the open/close lid for protecting a picture-taking lens when the open/close lid for protecting a picture-taking lens drops off, this cutting means being provided in the apparatus body Therefore, if the open/close lid for protecting a picture-taking lens drops off, the lead wires are cut by the cutting means, and hence the open/close lid for protecting a picture-taking lens is completely cut apart from the body of the electronic imaging apparatus.

In addition, an electronic imaging apparatus according to a third invention comprises a strobe device and has members from a housing, which is a structure of the body, to its exterior that are formed with conductive material, the electronic imaging apparatus characterized in that a part adjacent to a strobe flashing unit in the housing is formed with a non-conductive clear member and this clear member is constructed to include a flash transmitting surface portion which transmits the flash from the strobe flashing unit and a part that is not part of the flash transmitting surface portion facing a part of the back of a strobe reflector.

Therefore, the adverse influence such as the discharge and electromagnetic wave noise that arise from the strobe device is prevented, satisfactory image pickup results (images) are obtained, and miniaturization of the apparatus itself is realized.

The above and further objects and advantage of the present invention will become further apparent from the following detailed description.

According to the first invention, since the trigger transformer is contained with the strobe flashing unit in the open/close lid for protecting a picture-taking lens, it becomes possible to suppress the adverse influence given to each processing circuit inside the apparatus body by the electromagnetic wave noise arising in the strobe flashing unit, and in particular, since the trigger transformer is also contained together, it becomes possible to shorten the distance between the trigger transformer and the strobe flashing unit, and hence it becomes possible to further effectively suppress the occurrence of the electromagnetic wave noise due to the wiring of high-voltage signal lines.

In addition, since it becomes possible to suppress the electromagnetic wave noise as described above, it becomes possible to make the shielding of the apparatus body simple, and hence it becomes possible to secure high reliability of the electronic imaging apparatus and to make the electronic imaging apparatus smaller.

Furthermore, according to the second invention, since the lead wires of the strobe flashing unit are cut, for example, if the open/close lid for protecting a picture-taking lens drops off from the apparatus body due to the impact of drop and the like, a user recognizes that it is impossible to completely repair the apparatus by himself/herself. Therefore, it becomes possible to prevent the user from continuing the image pickup operation after the user performs assembly in the incomplete state, and to provide the electronic imaging apparatus capable of securely preventing image pickup failure and the like.

Moreover, according to the third invention, since the part adjacent to the strobe flashing unit in the housing is formed with a non-conductive clear member that is constructed to include the flash transmitting surface portion that transmits the flash from the strobe flashing unit and since there is a part that is except the flash transmitting surface portion and faces to a part of the back of a strobe reflector, it becomes possible to simply prevent the discharge (spark), arising between the strobe reflector and the housing members, and the like with securing a function for preventing the electromagnetic wave noise by covering the part facing the part of the back of the strobe reflector through extending a part of a strobe window having the flash transmitting surface portion, thereby also providing an electronic imaging apparatus capable of facilitating assembly with a reduction in the manufacturing cost.

DESCRIPTION OF THE PREFERRED EMBODIMENTS

An entire construction of a digital still camera that is an electronic imaging apparatus of a first embodiment according to the present invention will be described with reference to FIGS. 1 to 7. In addition, in FIGS. 1 and 5 two lines having solid and broken portions show positions at the time when a lens barrier is opened. In addition, respective elements of an electric control system such as switches and LED's used in the following description will be described with reference to a block diagram of the electric control system shown in FIG. 8.

Figure 5:
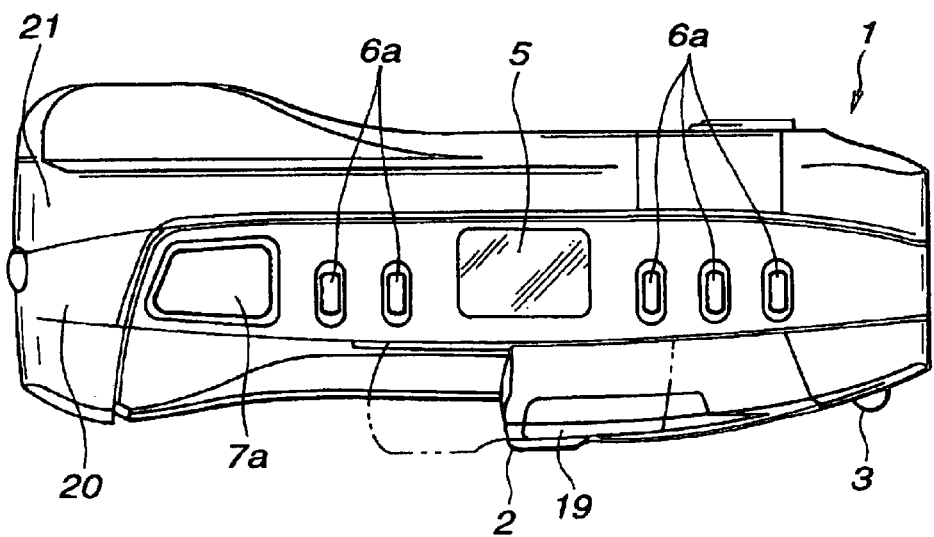
FIG. 5 is a top view showing the appearance of the electronic imaging apparatus shown in FIG. 1.
Figure 6:
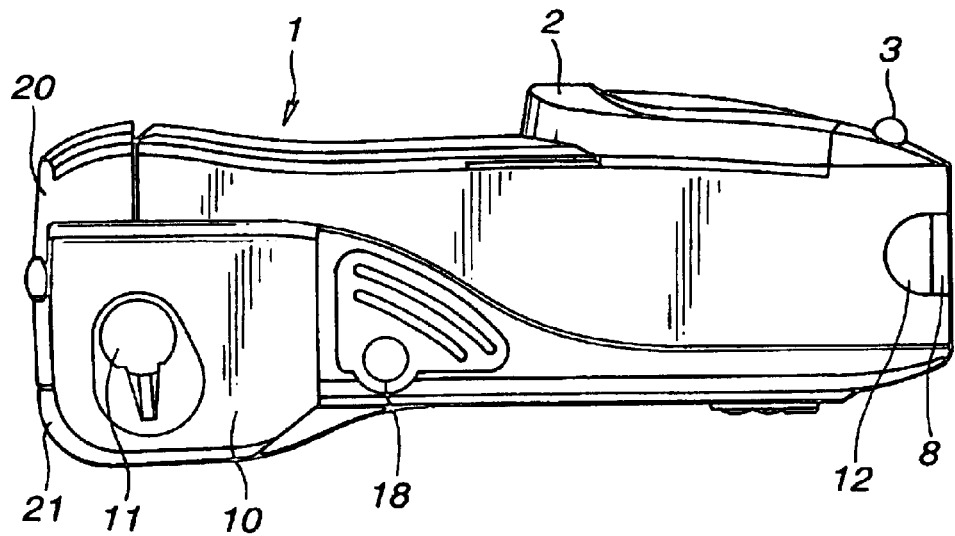
FIG. 6 is a bottom view showing the appearance of the electronic imaging apparatus shown in FIG. 1.

A body 1 of this digital still camera is composed of two exteriors, that is, a front cover 20 and a rear cover 21, into which the body is roughly divided, as shown in FIGS. 5 and 6.

In front of the front cover 20 of the body 1, a picture-taking lens 22 and an optical finder window 16b are located at positions to the right. In addition, a lens barrier 2 that is a member for protecting the picture-taking lens 22 and an optical finder window 16b and an open/close lid for the picture-taking lens that is slidable to left/right and open/close positions. Furthermore, a self-timer display window 3 is located in the lower right corner which is not covered by the lens barrier 2.

The lens barrier 2 can make the picture-taking lens 22 and the optical finder window 16b exposed or covered by sliding to open or close direction at the time of picture-taking or non-picture-taking. A lens barrier switch 35 (See FIG. 8) that is turned on/off with the open/close operation of the lens barrier 2 is located inside the body 1. In company with on/off of this switch 35, a power supply of an entire digital still camera is turned on or off. In addition, since a click force generated by a click mechanism not shown acts when the lens barrier 2 is at the barrier open position (the state in FIG. 2), the open state of the lens barrier 2 is kept.

Furthermore, a strobe window 19 is provided in the lens barrier 2, and a strobe flashing unit, a trigger transformer, and the like that construct a strobe device are contained inside the window 19 to move with the lens barrier 2 in a one-piece with sliding. By the strobe flashing unit moving with the lens barrier 2 in this manner, a distance between the picture-taking lens 22 and the strobe flashing unit is appropriately secured.

The self-timer display window 3 is an approximately ellipse translucent member and is located with projecting from the camera body 1 as shown in FIGS. 5 and 6. Inside the self-timer display window 3, an LED 45 (see FIG. 8) implemented on a printed circuit board (not shown) within the camera body 1 is positioned. Although emission of the LED 45 is controlled by a system controller 30 and is performed at the time of operation in a self timer mode, it is possible to observe the state of its emission from oblique directions besides the front by the entire window lighting because the display window 3 has a projecting ellipse shape as described above.

Figure 3:
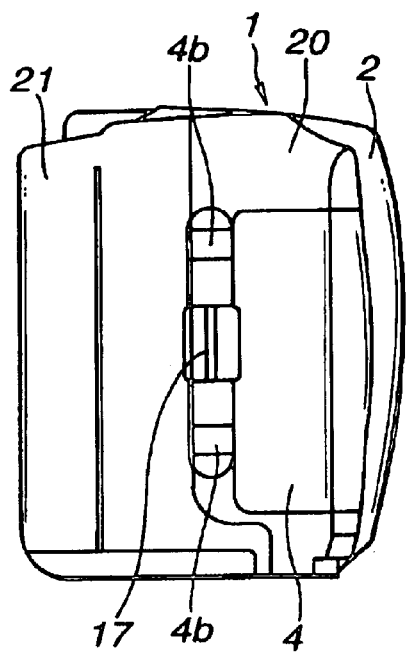
FIG. 3 is a left side view showing the appearance of the electronic imaging apparatus shown in FIG. 1.

A memory card lid 4 that is used for covering an opening of a mounting unit of a memory card 41 (see FIG. 8) and can be opened and closed is located in the left side of the camera body 1 as shown in FIG. 3. The memory card lid 4 is rotatably supported in the camera body 1 by a fixed hinge shaft 17 through hinge portions 4b.

In addition, a memory card lid switch 36 (see FIG. 8) that turns on/off with interlocking with open/close of the memory card lid 4 is provided inside the camera body 1. Therefore, if the camera is operated in the state of the lid 4 being not completely closed when the memory card 41 is mounted, an output of the lid switch 36 is detected to sound an alarm by a buzzer 55 (see FIG. 8), and hence it is possible to securely protect the memory card 41.

Furthermore, the hinge portions 4b are provided in two positions, that is, upper and lower positions, the camera body has a concave shape in their intermediate position, and hence the hinge shaft 17 inserted into the hinge portions 4b is exposed. Therefore, this hinge shaft can be used as a shaft for threading a portable hand strap.

Figure 4:
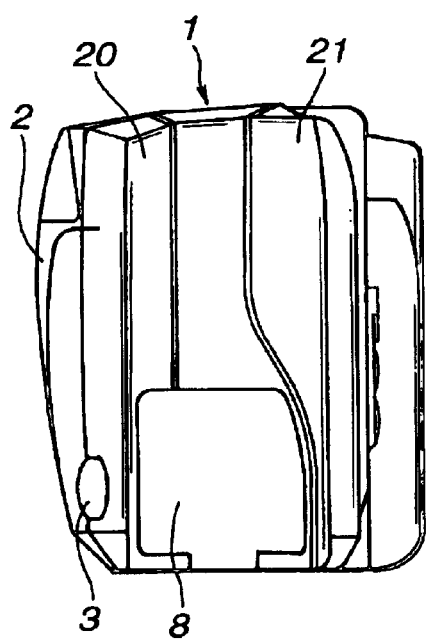
FIG. 4 is a right side view showing the appearance of the electronic imaging apparatus shown in FIG. 1.

An external terminal lid 8 that can be opened and closed is located in the right side of the camera body 1 as shown in FIG. 4. Inside this external terminal lid 8, an external device terminal 56 (see FIG. 8), which is a terminal block for a video signal output and a digital output that is described later, and an external power supply terminal 54 (see FIG. 8), which is an external power supply terminal block, and the like are contained, and it is possible to prevent dust from invading the respective terminals when they are not used, by closing the external terminal lid 8. In addition, in case of opening the external terminal lid 8, it is possible to open it by pulling down it with a finger from a concave portion 12 (see FIG. 6) for finger hooking that is provided in the bottom of the camera body 1.

In the upper surface of the camera body 1, operation buttons 6a for an operation mode setting switch 6 (see FIG. 8) are provided with locating in the center a mode LCD 5 displaying a state of each operation mode of the camera as shown in FIG. 5, two of which are located in the right and three of which are in the left. Furthermore, in the left side of the upper surface, an operation button 7a for a release switch 7 (see FIG. 8) is provided. The release switch 7 is a record instruction switch at the time of picture-taking, it becomes possible to record image information under image pickup in the memory card 41 and the like by operating this.

In the bottom of the camera body 1, a battery lid 10 that is used for exchanging a battery 51 (see FIG. 8) for a camera power supply and can be opened and closed is provided in the left of the rear cover 21 besides the finger hooking concave portion 12 as shown in FIG. 6, and a screw hole 18 for a tripod is provided in the approximate center to the left.

An eggshaped concave portion is formed in the approximate center of the battery lid 10, and an operation knob 11 that is rotatable is provided in this concave portion. By rotating this operation knob 11, a lock mechanism (not shown) inside the battery lid 10 is released, the battery lid 10 is rotated with setting a hinge portion to the approximate center of the camera body as the center and is opened, and hence it becomes possible to exchange a battery. In addition, the thickness of the operation knob 11 is within the depth of the concave portion, and the knob 11 is formed lest it should project from the bottom of the camera body 1.

Figure 7:
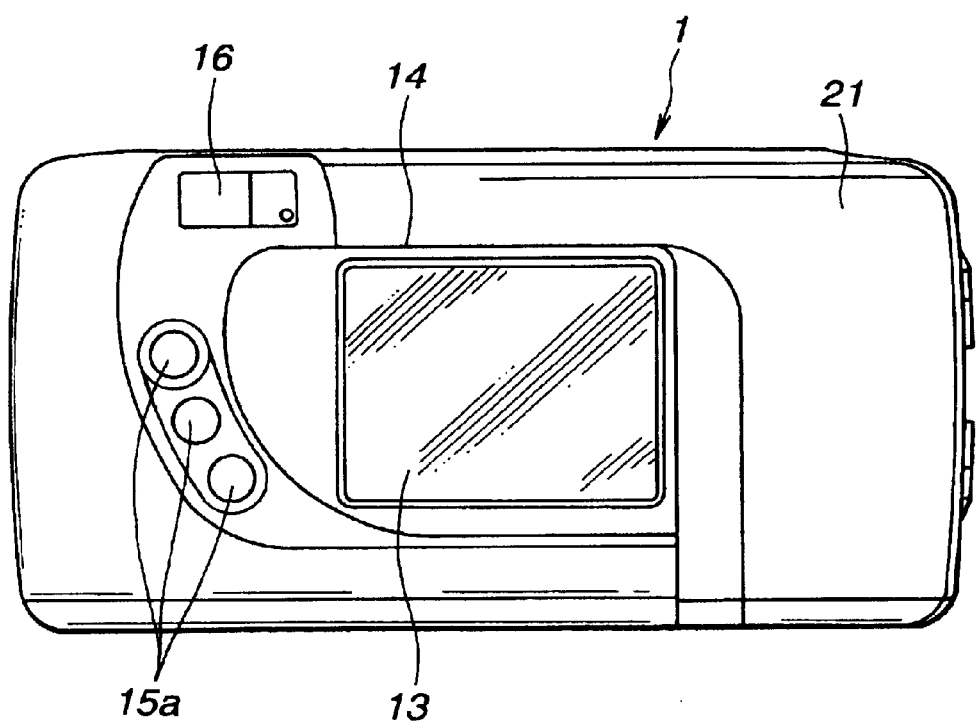
FIG. 7 is a rear view showing the appearance of the electronic imaging apparatus shown in FIG. 1.

A color liquid crystal display unit (hereinafter, color LCD) 13 for image display is located in the approximate center of the back of the camera body 1 as shown in FIG. 7. The color LCD 13 is mounted in the state that the color LCD 13 is surrounded with an auxiliary cover 14. Then, in the left of the color LCD 13, three operation buttons 15a for an LCD operation switch 15 (see FIG. 8) are provided. Furthermore, in the upper part of the back, an optical finder eyepiece window 16 for confirmation of a subject is also located.

Next, the construction of an electric control system of a digital still camera according to the present embodiment will be described with reference to a block diagram of the electric control system shown in FIG. 8.

Figure 8:
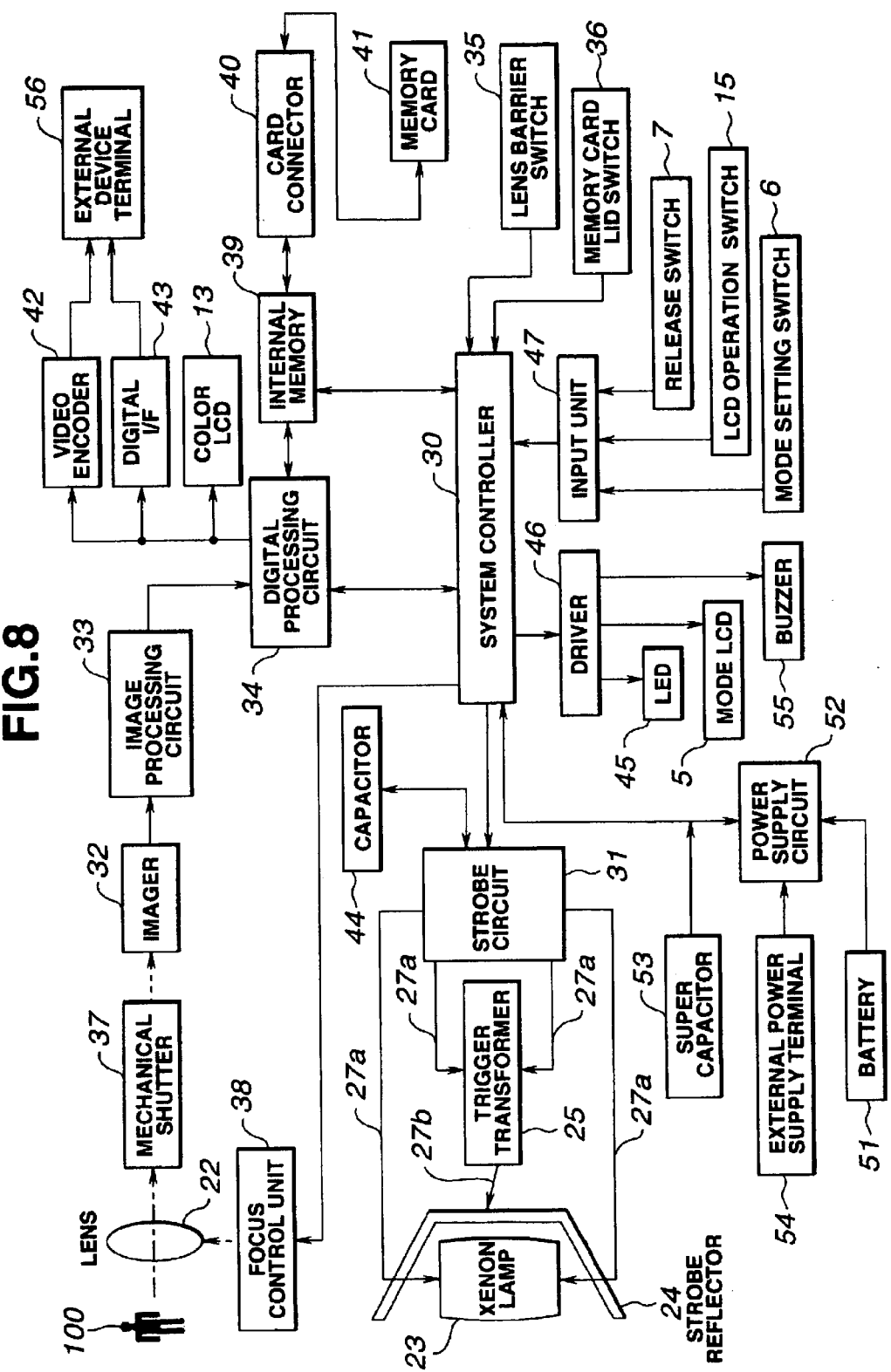
FIG. 8 is a block diagram of an electric control system of the electronic imaging apparatus shown in FIG. 1.

In the digital still camera, the entire electric control system is controlled by a system controller 30 as shown in FIG. 8. The electric control system is mainly composed of an image pickup unit, a strobe flashing unit, a display/warning unit, an operation switch unit, and a power supply unit.

When an image of a subject is picked up in the image pickup unit, first, a subject beam passing through a picture-taking lens 22 is image-formed in an imager 32. In addition, a mechanical shutter 37 is provided between the picture-taking lens 22 and imager 32, and exposure energy to the imager 32 is controlled by this mechanical shutter 37. Furthermore, focus adjustment of a subject image is performed by a focus control unit 38.

The subject image is converted from an optical signal to an electric signal by the imager 32, and is recorded in an internal memory 39 through an image processing circuit 33 and a digital processing circuit 34 to be recorded in the memory card 41, being connected to a card connector 40 through the memory 39, as image information.

Moreover, an image under image-taking or an image recorded in the internal memory 39 or memory card 41 can be displayed in the color LCD 13. In addition, as an image output to the external, two kinds of output signals, that is, a video output converted into a video signal by a video encoder 42 and a digital output converted by a digital interface (I/F) 43 can be selected. Those outputs are taken out though the external device terminal 56.

The strobe flashing unit constructing the strobe device are composed of a strobe circuit 31, a capacitor 44 for charge, a trigger transformer 25, a reflector 24, and a xenon tube 23. Nevertheless, the trigger transformer 25, reflector 24 and xenon tube 23 are contained in the lens barrier 2, and are electrically connected with four lead wires 27a to a printed circuit board 29 (see FIG. 10) in the camera body 1. Furthermore, the trigger transformer 25 and xenon tube 23 are electrically connected via lead wires 27b in the lens barrier 2.

The display/warning unit is driven through a driver 46, and is composed of an LED 45 for self timer display, an mode LCD 5 for displaying the setting state of an operation mode, and a buzzer 55 for warning.

The operation switch unit is composed of a mode setting switch 6 for setting an operation mode, an LCD operation switch 15 for selecting an image to be displayed in the color LCD 13, a release switch 7 for instructing the system controller to fetch an image under image-taking, a memory card lid switch 36 detecting the open/close state of the memory card lid 4, a lens barrier switch 35 detecting the open/close state of the lens barrier, and the like.

In addition, outputs of the mode setting switch 6, LCD operation switch 15, and release switch 7 are taken in the system controller 30 through an input unit 47 that is a switch input circuit.

The power supply unit is composed of a battery 51 and a power supply circuit 52 as a driving power supply of the camera, an external power supply terminal 54 that an external power supply can be connected to, and a super capacitor 53 for auxiliary power supply.

The above-mentioned is the rough construction of the entire digital still camera.

Next, the construction of the lens barrier 2 in this digital still camera will be described hereafter with reference to FIGS. 9 to 11.

As described above, the lens barrier 2 of this digital still camera can move in the left/right and open/close directions with sliding, the strobe window 19 is provided in the upper part of its front, and the trigger transformer 25, and the reflector 24 and xenon tube 23 that are the strobe flashing unit are contained inside the lens barrier 2.

Figure 9:
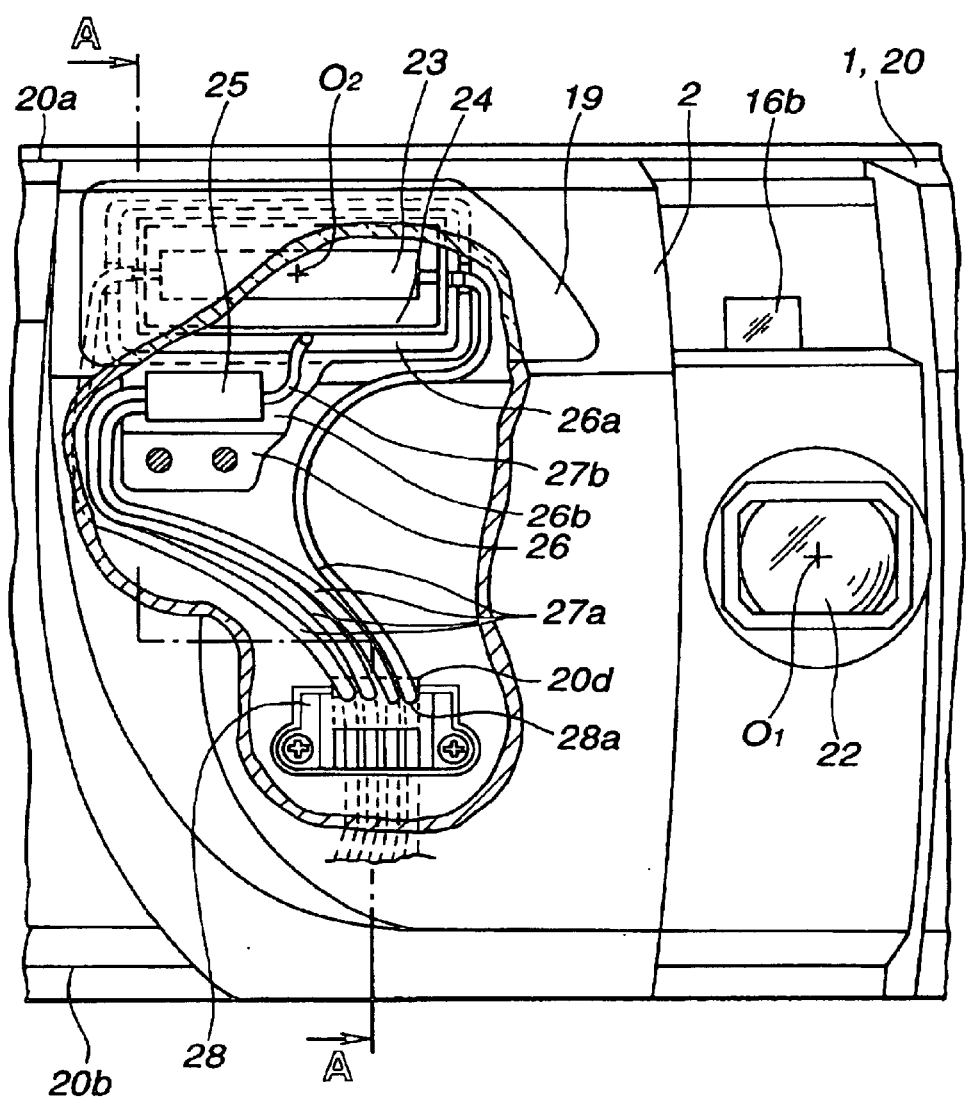
FIG. 9 is an enlarged front view of a main part that shows a part of the vicinity of a lens barrier, which is opened, in the electronic imaging apparatus shown in FIG. 1.
Figure 10:
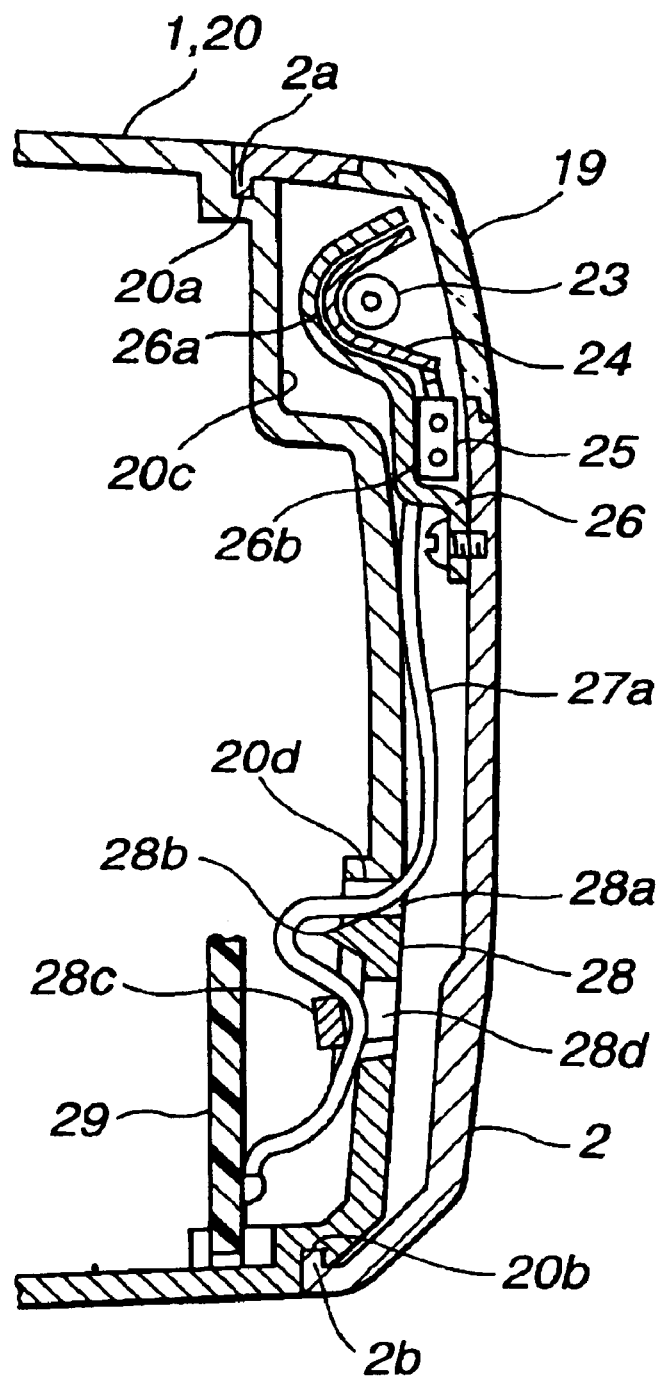
FIG. 10 is an enlarged cross-sectional view of a main part taken on line A—A of FIG. 9.

Thus, the lens barrier 2 can move in the left/right directions of the body 1 with sliding by slide projections 2a and 2b being slidably fitted in a guide grooves 20a and 20b provided in the front cover 20 of the body 1 as shown in FIGS. 9 and 10. Furthermore, a strobe flashing unit holding member 26 that is a holding member is fixed with screws and the like inside the strobe window 19 of the lens barrier 2.

The holding member 26 is a resin member, and has a concave containing portion 2a containing the reflector 24, and a concave portion 26b thereunder, containing the trigger transformer 25. Although the back of the containing portion 26a of the holding member 26 is convex, its exterior side is approximately flat.

The convex portion of the back of the containing portion 26a is inserted into a concave part 20c of the front cover 20 of the camera body 1, and the front cover is formed in the shape along the convex shape of the holding member 26. The concave portion 20c of the front cover 20 and its vicinity are a part that can be secured as an empty space in regard to layout in the camera, and hence it is convenient for containing the xenon tube 23 and reflector 24 of the strobe flashing unit, and the trigger transformer 25, and the like.

The reflector 24 contained in the containing portion 26a is curved, and the xenon tube 23 is mounted therein. Then, the flashing direction of the xenon tube 23 to the subject is adjusted with the curvature. In addition, since the projected plane of the reflector 24 is smaller than the strobe window 19, the predetermined insulation distance between the reflector 24 and exterior members can be secured even if the lens barrier 2 and front cover 20 are conductive members.

Although the trigger transformer 25 contained in the concave portion 26b is a transformer raising a voltage for obtaining a voltage necessary for flashing the xenon tube 23, its output voltage is applied to the reflector 24 via the lead wires 27b. The length of the lead wires 27b can be further shortened because the trigger transformer 25 is just under the reflector 24, and hence this is effective to reduce voltage drop and to suppress the occurrence of noise.

On the other hand, an opening 20d for leading lead wires 27a out to the strobe flashing unit through a lead wire fixing member 28 is provided in the lower part of the front cover 20.

Figure 11:
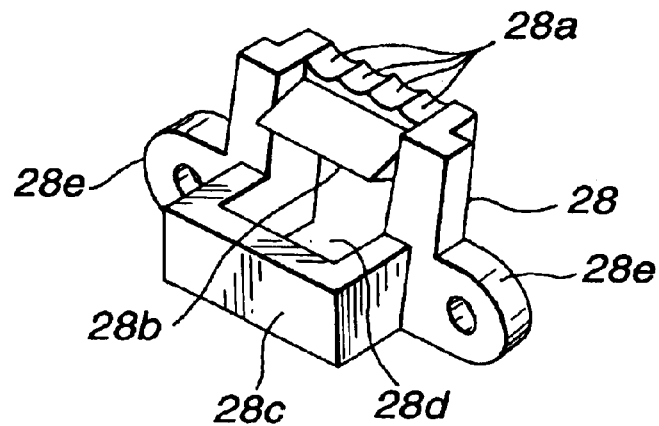
FIG. 11 is an enlarged perspective view showing only a lead wire fixing member that is applied to the electronic imaging apparatus shown in FIG. 1.

The lead wire fixing member 28, as shown in FIG. 11, comprises attaching portions 28e for attaching the member 28 to the front cover 20, four lead wire supporting portions 28a, a blade portion 28b that is provided in parallel to the direction of the line of these lead wire supporting means having a sharp edge shape, and a member 28c having a lead wire insert portion 28d, and is fixed with screws and the like to the opening 20d of the front cover 20 with the blade portion 28b facing to the inside. In addition, the blade portion 28b acts as a cutting member cutting a contact part when the lead wires 27a collide against the portion 28b due to the action of large tension.

The lead wires 27a for connecting the strobe flashing unit is composed of four wires, and their one end portions are connected to a printed circuit board 29 in the camera body 1. In addition, other end potions are connected to the strobe flashing unit.

Thus, the lead wires 27a are inserted from the printed circuit board 29 through the lead wire inserting portion 28d of the lead wire inserting member 28, and is located through the lead wire supporting portion 28a after being made to execute a U-turn with keeping a space against the portion 28b. In this passing-through portion, the lead wires 27a are pinched and held by the opening 20d of the front cover 20 and the lead wire supporting portion 28a. Furthermore, the lead wires 27a are wired along the back of the lens barrier 2, passe through each through-hole provided in the holding member 26, two of four lead wires 27a are connected to terminals of the xenon tube 23, and other two lead wires 27a are connected to terminals of the trigger transformer 25 respectively.

In addition, although the lead wires 27a wired between the lead wire supporting portion 28a and the terminals of the xenon tube 23 or the terminals of the trigger transformer 25 swing with the lead wire supporting portion 28a as the center, it is possible to make them swing without a hindrance because of intentional slight slackness. Furthermore, the lead wires 27a are never exposed outside from the lens barrier 2.

Moreover, since the blade portion 28b is positioned with facing more inside than the surface of the apparatus body 1 after the lead wire fixing member 28 is built in the apparatus body 1, a hindrance in assembly work of the apparatus body 1, lens barrier 2, and the like never arises, and good workability can be obtained because the lead wires 27a are bundled with the lead wire fixing member 28.

In addition, a symbol O1 shown in FIG. 9 shows an optical axis of the picture-taking lens 22, and a symbol O2 shown in the figure shows an optical axis of the strobe flashing unit.

Next, the construction in the vicinity of the strobe flashing unit of the strobe device in this digital still camera will be described below with reference to FIG. 12.

As described above, the lens barrier 2 that is an open/close lid for protecting the picture-taking lens that covers the picture-taking lens 22 and the like is slidably provided in the front of the digital still camera that is an electronic imaging apparatus of this embodiment, and the xenon tube 23 that is a flashing discharge tube that flashes, the strobe reflector 24 for converging in the front a flashed beam emitted by this xenon tube 23, and a trigger transformer 25 (not shown in FIG. 12), which are a part of members composing the strobe flashing unit that is a strobe device, are contained inside this lens barrier 2.

Figure 12:
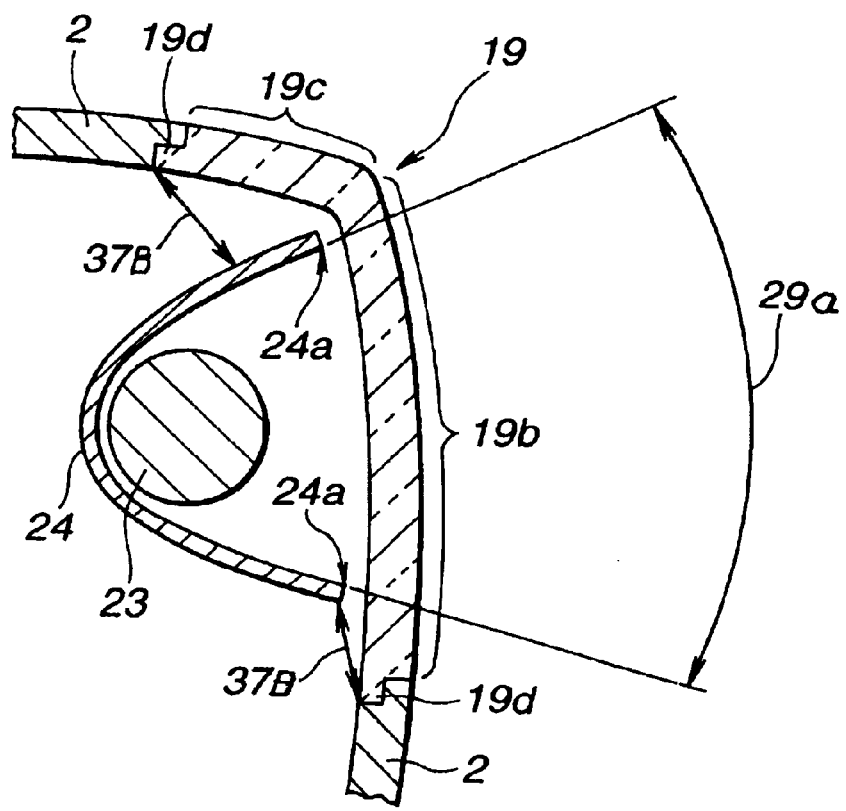
FIG. 12 is an enlarged cross-sectional view of a main part that shows the vicinity of a strobe flashing unit located in a housing in the electronic imaging apparatus shown in FIG. 1.

The cross-section of the strobe reflector 24 is approximately semi-elliptic as shown in FIG. 12, and the xenon tube 23 is located in the center part of the reflector 24. Them, a range surrounded by two lines extended from an opening edge portion 24a of the reflector 24 is an illumination range 29a of the strobe reflector.

In addition, the strobe window 19 is located in front of the strobe reflector 24, the strobe windows 19 which protects the strobe flashing unit composed of the xenon tube 23 and strobe reflector 24 and is formed with a clear member that has a flash transmitting surface portion 19b making the flashed beam, which is emitted from the xenon tube 23 and is converged by the strobe reflector 24, pass.

The strobe window 19 forms a reflector protective surface portion 19c by extending from the upper end surface of the flash transmitting surface portion 19b further to the upper part of the lens barrier 2. Thus, this reflector protective surface portion 19c is formed with extending to a part facing to a part of the back of the strobe reflector 24 so that the surface portion 19c may cover the upper part of the strobe reflector 24.

In this manner, the strobe window 19 are composed of two surfaces, that is, the flash transmitting surface portion 19b and reflector protective surface portion 19c that are formed with a clear member. Then, both end portions 19d of the strobe window 19 are fixed with engaging with and being built in a barrier housing member, constructing the lens barrier 2, as a one-piece.

Although the lens barrier 2 is formed by injection molding with using a non-conductive member such as resin, the housing member of this lens barrier 2 is given processing of giving conductivity such as coating and plating to its internal and external surfaces so as not to leak the electromagnetic wave noise and the like that internal electronic circuits produce with strobe flashing and other electronic signals.

The operation at the time of picture-taking and the like in the digital still camera of this embodiment constructed like this will be described below.

First, the case that picture-taking with a strobe is performed with this digital still camera will be described.

Figure 1:
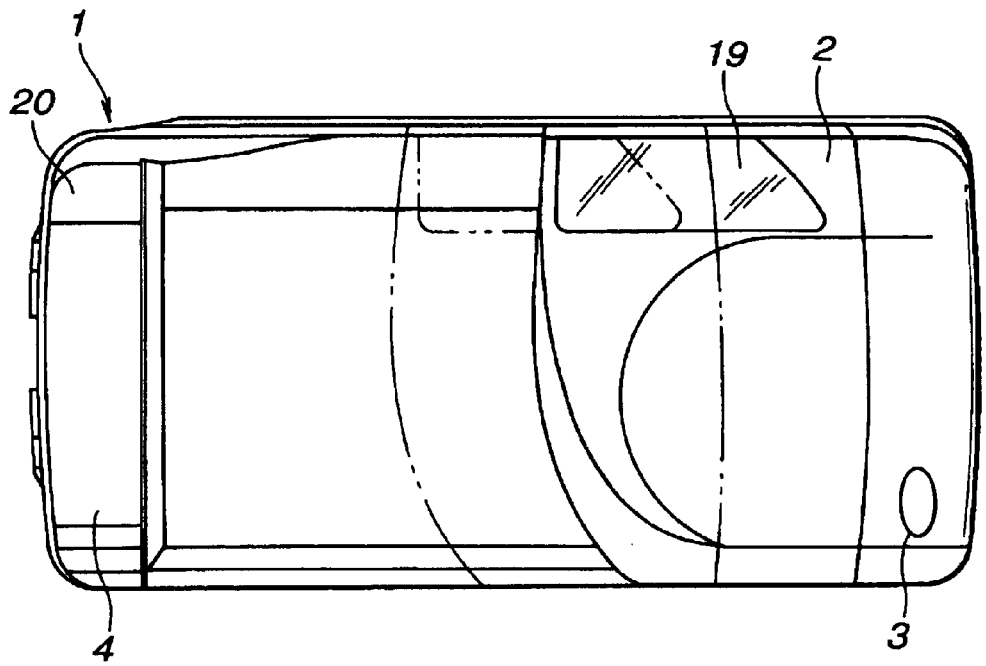
FIG. 1 is a front view showing the appearance of an electronic imaging apparatus (a digital still camera) showing a first embodiment of the present invention, a lens barrier/ being closed.
Figure 2:
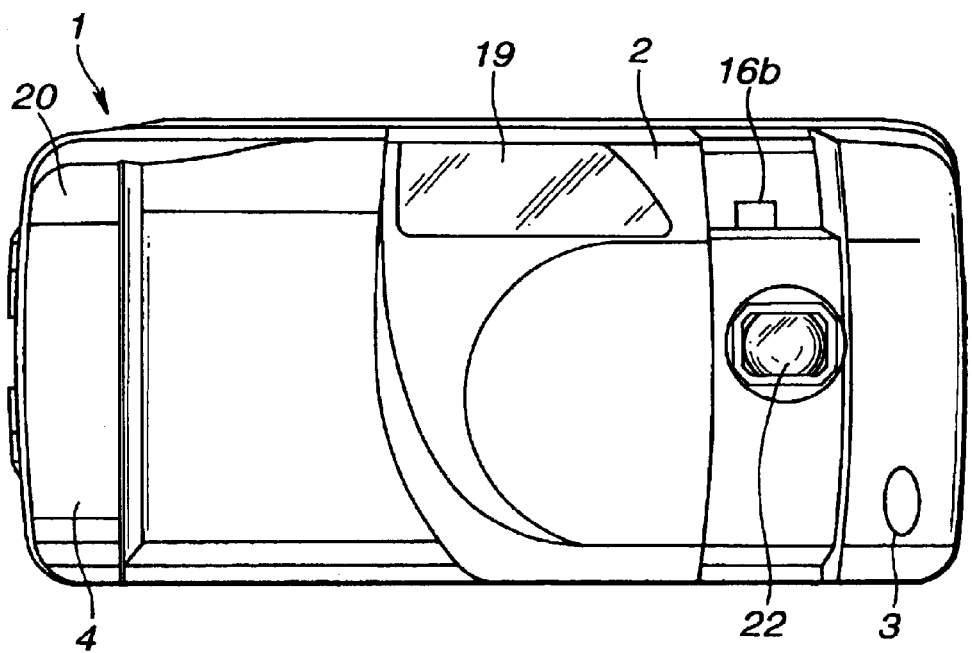
FIG. 2 is a front view showing the appearance of the electronic imaging apparatus shown in FIG. 1, a lens barrier being opened.

If the lens barrier 2 is moved from the close position in FIG. 1 to the open position in FIG. 2 and the picture-taking lens 22 and optical finder window 16b are released, the power supply of this camera is turned on through the lens barrier switch 35. In this open state of the lens barrier, as shown in FIG. 9, the optical axis O1 of the picture-taking lens 22 and the optical axis O2 of the strobe flashing unit are apart from each other in predetermined distance, and this is the state in which the red-eye phenomenon caused by strobe flashing can be suppressed.

If the picture-taking-with-a-strobe mode is set with the mode setting switch 6 in this state, the strobe device operates. First, the state becomes ready for picture-taking with a strobe by charging the capacitor 44 through the strobe circuit 31 by the instruction of the system controller 30. In this time, if the release switch 7 is operated, the system controller 30 performs focusing operation against a subject 100 by controlling the picture-taking lens 22 through the focus control unit 38, and exposure operation is performed thereafter. At the time of this exposure operation, high voltage is applied from the trigger transformer 25 to the strobe reflector 24 via the lead wires 27b, and current passes through the xenon tube 23 if charges in the capacitor 44 are discharged. Then, this xenon tube 23 discharges and flashes. This flash is converged by the strobe reflector 24, passes through the flash transmitting surface portion 19b forming a part of the strobe window 19, and is applied to the subject within the illumination range 29 in the front. Then, image pickup operation of the subject is performed by the imager 32. An image signal of the subject image obtained by this is recorded in the internal memory 39, and is further recorded in the memory card 41 and the like through the card connector 40. In this manner, a series of picture-taking operation is completed.

In addition, in the digital still camera of this embodiment, even if a part of current leaks from the xenon tube 23 of the strobe device discharges and flashes, discharge does not arise between the strobe reflector 24 and lens barrier 2 because this camera is constructed with securing sufficient creeping distance 37B for insulation between a part of the back of the strobe. reflector 24 and the inner wall surface of the housing member of the lens barrier 2 to which conductive surface processing is performed.

Next, the state at the time when the lens barrier 2 drops off from the camera body 1 will be described.

The lens barrier 2, as described above, has such a structure that the lens barrier 2 is held against the front cover by the slide projections 2a and 2b being slidably fitted in the guide grooves 20a and 20b. Therefore, if a large impact force acts on the lens barrier 2, for example, this digital still camera is erroneously dropped in operation, the lens barrier 2 may disengage with the guide groove 20a.

In this case, if the lens barrier 2 disengages and drops off, a large tension acts on the lead wires 27a. Therefore, the lead wires 27a collide against the blade portion 28b due to this large tension, and hence the lead wires 27a are cut. Owing to this, the lens barrier 2 is completely separated from the camera body 1.

If the lead wires 27a are cut in this manner, a user recognizes that repair by himself is impossible, and hence the user brings the camera body 1 and the separated lens barrier 2 to a repair shop to ask their repair. Therefore, it becomes possible to avoid such a state that a user incompletely repairs a camera and continues picture-taking with the incomplete camera.

On the other hand, since the blade portion 28b of the lead wire fixing member 28 is located inside the front cover 20 in the camera body 1, the cut portion of the lead wires 27a residing in the camera are not exposed more outside than the front cover 20. Therefore, it is prevented a user from directly touching the cut lead wires 27a, charging unit, and the like with his/her hand.

As described above, according to the digital still camera of this embodiment, although high voltage of current is supplied to the xenon tube 23 at the time of picture-taking with a strobe and further pulse-like ultra high voltage is applied to the strobe reflector 24 through the trigger transformer 25, the trigger transformer 25, which is in particular a strong noise resource, in addition to the xenon tube 23 and strobe reflector 24 are built in the lens barrier 2 and are separated from the inside of the camera body, the influence of noise arising in those portions to the imager 32 and other processing circuits inside the camera body is reduced thereby, and hence it becomes possible to record a satisfactory image signal, which is image-taken and is affected little by the noise, in memory and the like.

In addition, also in regard to a connecting portion of the trigger transformer 25, since the trigger transformer 25 is located near to the xenon tube 23 and the length of the lead wires 27b connecting to the strobe reflector 24 becomes extremely short thereby, it becomes possible to drastically reduce noise arising in the lead wires. Therefore, since, without special measures such as a shield, there becomes a small possibility that image quality is degraded by the image pickup circuit and the like being affected by the noise, it becomes possible to reduce parts used for noise reduction, to densify printed circuit boards, and to perform miniaturization and reduce cost.

Furthermore, since the strobe flashing unit and trigger transformer 25 are isolated in the lens barrier 2, it becomes easy to electrically shield the inside of the camera body according to necessity, and hence this becomes advantageous to reduction of manufacturing cost and space saving.

Moreover, since the xenon tube 23, strobe reflector 24, trigger transformer 25, and the like are mounted on the strobe flashing unit holding member 26, easiness of assembly increase, design flexibility increases, and miniaturization of a camera can be also realized.

In addition, owing to adoption of such a construction, it becomes possible to adopt an open/close lid for protecting a picture-taking lens, that is, the lens barrier 2 also in an electronic imaging apparatus.

Furthermore, since an empty space originally exists in the vicinity of the strobe reflector 24 in the open/close lid for protecting a picture-taking lens, that is, the lens barrier 2, it becomes possible to effectively utilize the space by locating the trigger transformer 25 there, and hence it becomes possible to avoid upsizing of the open/close lid for protecting a picture-taking lens, that is, the lens barrier 2.

Moreover, the back of the reflector containing portion 26a of the lens barrier 2 is naturally convex, and the convex portion is positioned in the concave portion 20c occurring due to arrangement in the front cover.

Thus, since the appearance of the open/close lid for protecting a picture-taking lens, that is, the lens barrier 2 in the back side of the reflector 24, having a large projected plane, and the concave portion is formed in the portion corresponding to the convex portion of the apparatus body, it is sufficient to increase the thickness of only a part of the convex portion in regard to the cross-section of the lens barrier 2, and hence it becomes possible to make the appearance of the open/close lid 2 for protecting a picture-taking lens approximately flat without increasing the thickness of the entire electronic imaging apparatus. Owing to this, it becomes possible to increase portability and manageability.

In addition, the empty space just under the reflector 24 in the lens barrier 2 is used as a located position of the trigger transformer 25. Therefore, it becomes possible to make the appearance of the camera approximately flat and to provide the lens barrier 2 incorporating a smaller strobe flashing unit without making the camera so much thick, and without forward projecting the strobe flashing unit, and it becomes possible also to increase the portability and manageability of the entire camera.

On the one hand, as described above, if the camera is dropped and the lens barrier 2 is disengaged, the lead wires 27a are also cut by the tension at the time of disengaging, and hence a user securely recognizes that the user cannot repair the camera by himself/herself. Thus, since the user clearly recognizes that only the professional repair shops can repair the camera as a completely operative one, it becomes possible to securely avoid such a state that the user incompletely assembles the camera and invites picture-taking failure.

In addition, the repair of the lead wires 27a being cut due to disengagement of the lens barrier 2 is only the work of exchanging the lead wires 27a in a repair section and the like, and hence charges to the user is light because a repair period is short, repair cost is low, and the camera can be easily repaired as the completely operative one.

Furthermore, since the cutting means (the blade portion 28b) is positioned inside the apparatus body after the lead wire fixing member 28 is built in the apparatus body, a hindrance in assembly work of the apparatus body 1, open/close lid for protecting a picture-taking lens, that is, lens barrier 2 and the like never arises, and there is no probability that the user touches the charging unit with his/her hand because the cut portion is made to reside inside the apparatus body.

On the other hand, since the reflector protective surface portion 19c is formed with extending the flash transmitting portion 19b of the strobe window 19, which is made of a clear member, so that the surface portion 19c may cover the upper part that is a part of the back of the strobe reflector 24, it is possible to easily prevent the discharge (spark) between the strobe reflector 24 and housing member without changing arrangement of the strobe device with securing a sufficient space between the conductive housing member of the lens barrier 2 and the strobe flashing unit (in particular, the back of the strobe reflector 24), to suppress the manufacturing cost, and to facilitate easiness of assembly.

Thus, it is possible to further easily prevent the discharge from the strobe flashing unit without changing the arrangement of internal members and upsizing the camera itself.

In addition, although, in this embodiment, such an example that the reflector protective surface portion 19c of the strobe window 19 is formed so that the portion 19c may cover the upper part of the strobe reflector 24, the portion 19c can be also formed so that the portion 19c may cover the side of the strobe reflector 24.

Furthermore, it is sufficient as the strobe window 19 that the two portions of the reflector protective surface portion 19c and the flash transmitting portion 19b, which are formed with a clear member, are in a one-piece, and the cross-section of the window 19 is not limited to the shape shown in FIG. 12, but, for example, it is also good to continuously form the window 19 by a curvature.

Next, a second embodiment of the present invention will be described below with reference to FIG. 13. In addition, this embodiment has the construction approximately similar to that of the first embodiment fundamentally. Therefore, it is assumed that FIGS. 1 to 11 are seen for its construction, and the same numerals are assigned to the members in FIG. 13 that are the same as or equivalent to those in the former figures and description of them is omitted.

A lens barrier 2A in this embodiment, similarly to the lens barrier 2 of the first embodiment, comprises a strobe flashing unit inside, and its housing member is formed by injection molding with using a non-conductive member such as resin. Furthermore, the internal and external surfaces of the housing member is given electromagnetic wave preventive processing such as coating and plating so as to have conductivity.

Figure 13:
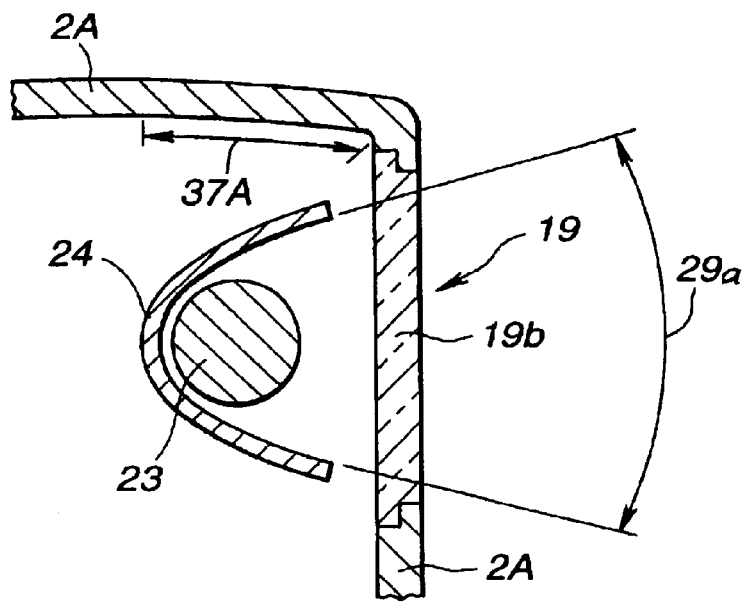
FIG. 13 is an enlarged cross-sectional view of a main part that shows the vicinity of a strobe flashing unit located in a housing in an electronic imaging apparatus of a second embodiment according to the present invention.

In addition, the strobe window 19, as shown in FIG. 13, is provided in front of the strobe reflector 24, protects the strobe flashing unit, and therewith comprises the flash transmitting surface portion 19b making flash beam from the xenon tube 23 pass.

Furthermore, the housing member of the lens barrier 2A that is a part (a part shown by the symbol 37A) facing to a part of the back of the strobe reflector 24 is made non-conductive.

Thus, in a manufacturing process of the housing member of the lens barrier 2A, after, for example, tape and the like is pasted on the non-conductive part 37A or masking with a key jig and the like is given to the part 37A, the housing member of the lens barrier 2A is given conductivity processing such as coating and plating. Owing to this, a part except the part given the masking is given the conductivity processing, and only the part except the part given this conductivity processing becomes non-conductive with including a part in the depth direction.

In this manner, according to the second embodiment, so long as only a predetermined part in the vicinity of the strobe flashing unit is processed to be non-conductive when the housing member of the lens barrier 2A is given the conductivity processing, it is possible without an engineering change due to changes and addition of constitutive members to easily prevent the discharge from the strobe reflector 27 to the lens barrier 2A. In addition, since it is unnecessary to change arrangement and the like of constitutive members constructing the camera, space efficiency is good, and hence it is possible to contribute to miniaturization of cameras.

Furthermore, since only the part facing to the part of the back of the strobe reflector 24 is made of non-conductive material, it is possible to locate the strobe reflector 24 in the vicinity of an inner wall surface of the strobe device, a useless space is not produced in the housing, and hence it is possible to contribute to the miniaturization of devices themselves.

Moreover, since only the part having a possibility of the discharge is formed with non-conductive material, it is possible to suppress the influence of electromagnetic wave preventive effect at a minimum as the entire housing.

In addition, since it is possible to switch the conductivity processing and non-conductivity processing without changes of member shapes, it is possible to easily correspond to engineering changes and the like just before manufacturing, and it is possible to increase utilization.

Next, a third embodiment of the present invention will be described below with reference to FIG. 14. In addition, although this embodiment fundamentally has the construction approximately similar to the second embodiment, the difference from the second embodiment is that a holding member 26 holding the strobe flashing unit, located in the lens barrier 2A, as a one-piece is provided and this holding member 26 covers the entire back of the strobe reflector 24. Therefore, the same symbols are assigned to similar constitutive members, and description of them is omitted.

Respective constitutive members constructing the strobe flashing unit of this embodiment, that is, the strobe reflector 24, xenon tube 23, trigger transformer 25, and the like are held as a one-piece by the holding member 26 fixed by a fixing member (not shown) in the lens barrier 2A.

Figure 14:
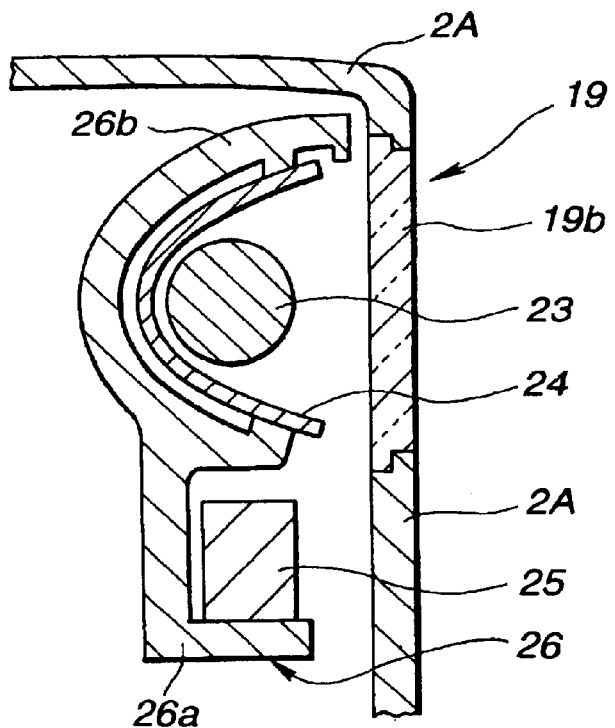
FIG. 14 is an enlarged cross-sectional view of a main part that shows the vicinity of a strobe flashing unit located in a housing in an electronic imaging apparatus of a third embodiment according to the present invention.

This holding member 26, as shown in FIG. 14, is formed by a reflector covering portion 26b, which is composed of a non-conductive member covering the entire back or at least an upper surface or a side surface of the strobe reflector 24, and a holding portion 26a that the trigger transformer 25 is placed on and held by. Furthermore, the reflector covering portion 26b also plays a role of holding the strobe reflector 24 and xenon tube 23.

Therefore, the reflector covering portion 26b plays a role of a shield by intervening in the space formed between the strobe reflector 24 and housing member of the lens barrier 2A, and hence the portion 26b prevents the discharge from the strobe flashing unit.

According to the third embodiment constructed in this manner, since the space between the strobe reflector 24 and housing member is shielded with using a part of the holding member 26 holding the strobe flashing unit, it is possible to easily prevent the discharge from the strobe flashing unit without increasing the manufacturing cost.

In addition, according to means of this embodiment, since the part of holding member, which is used for mounting the strobe reflector 24, xenon tube 23, and the like inside the housing and is made of the non-conductive material, is made to intervene in the space produced between the conductive housing member and strobe flashing unit, it is possible without affecting the electromagnetic wave preventive function by the conductivity processing and performing changes such as addition of parts and the like to prevent the discharge to the housing member and also to contribute to the reduction of manufacturing cost.

Thus, even if the housing member is made conductive with using as a housing member forming the lens barrier 2A, for example, metal-fiber-containing resin and the like, it becomes possible to effectively prevent the discharge from the strobe flashing unit by making the reflector covering portion 26b intervene as a shield between the strobe reflector 24 and housing member of the lens barrier 2A.

In addition, although, in each embodiment described above, a strobe device built in a lens barrier provided separately from a housing of a body is described, apparently from the construction described above, the application of the present invention is not limited to the lens barrier comprising the strobe device, but it can be similarly applied to an electronic imaging apparatus such as a digital still camera comprising a strobe device in its body.

Furthermore, although, in each embodiment described above, it is exemplified that the present invention is applied to a digital still camera, the present invention is not limited to this, but, for example, it is easily possible that the present invention is similarly applied to an electronic imaging apparatus, which has a strobe device inside its body and can record still images and dynamic images, that is, so-called a digital still camera and the like.

Moreover, recently, it is common that plenty of electronic circuits and the like are provided inside a camera body also in each camera using silver halide film. Therefore, the present invention can be also applied to such a camera using silver halide film, and similar effects can be expected.

In the present invention, it is apparent that embodiments different in a wide range can be formed on this basis of the present invention without departing from the spirit and scope of the present invention. The present invention is not restricted by any specific embodiment except being limited by the appended claims.

What is claimed is:

1. An electronic imaging apparatus comprising in front of a body an open/close lid for protecting a picture-taking lens, the open/close lid where a strobe flashing unit is incorporated, the electronic imaging apparatus comprising:

a cutting means for cutting lead wires electrically connecting an apparatus body and said strobe flashing unit in said open/close lid for protecting the picture-taking lens when said open/close lid for protecting the picture-taking lens drops off, wherein this cutting means is provided in said apparatus body.

2. The electronic imaging apparatus according to claim 1, further comprising a lead wire fixing member holding these lead wires in a part where said lead wires are taken out from an opening provided in said apparatus body, wherein said cutting means is formed with said lead wire fixing member as a one-piece, and said cutting means and said lead wire fixing member are fixed and located inside said apparatus body.

* * * * *